(12) United States Patent
Hindle et al.

(10) Patent No.: US 6,307,723 B1
(45) Date of Patent: Oct. 23, 2001

(54) PARALLEL-FEEDER DIRECTIONAL OVERCURRENT PROTECTION

(75) Inventors: Paul Joseph Hindle, Stafford; John William Wright, Stoke-on-Trent; Graeme John Lloyd, Stafford, all of (GB)

(73) Assignee: Alstom UK Ltd. (GB)

( * ) Notice: Subject to any disclaimer, the term of this patent is extended or adjusted under 35 U.S.C. 154(b) by 0 days.

(21) Appl. No.: 09/334,371

(22) Filed: Jun. 16, 1999

(30) Foreign Application Priority Data

Jun. 18, 1998 (GB) .................................................. 9813049

(51) Int. Cl.[7] .................................................. H02H 3/00
(52) U.S. Cl. ................................................. 361/63; 361/80
(58) Field of Search ........................... 361/62, 63, 64–66, 361/80–84; 307/127, 146; 324/522, 108, 86

(56) References Cited

U.S. PATENT DOCUMENTS 4,689,708 * 8/1987 Hager et al. ............................ 361/65
4,835,651   5/1989 Li et al. .................................. 361/68

FOREIGN PATENT DOCUMENTS

| 0 275 779 A1 | 7/1988 | (EP) | H02H/7/26 |
| 667256 | 2/1952 | (GB) | H02H/3/10 |
| 1 364 721 | 8/1974 | (GB) | H02H/3/10 |
| 2 036 477 A | 6/1980 | (GB) | H02H/3/02 |

* cited by examiner

Primary Examiner—Ronald W. Leja
(74) Attorney, Agent, or Firm—Kirschstein, et al.

(57) ABSTRACT

When directional overcurrent protection relays are included at the load end of a set of parallel feeders fed from an AC power source, a minimum fault-current threshold is specified based on the potential of a phase-to-phase fault at the source to cause a relay to operate misleadingly. This threshold is, for plain (transformerless) feeders, approximately 50% and, for transformer feeders, approximately 85% (nominally 86.7%) of rated pre-fault load current. These thresholds can, however, be ignored if the relay outputs are processed in a 2-out-of-3 circuit, so that a relay on one phase will only operate its associated circuit breaker if a relay on another phase has also operated, a condition which has been found not to obtain in the case of a source fault.

16 Claims, 8 Drawing Sheets

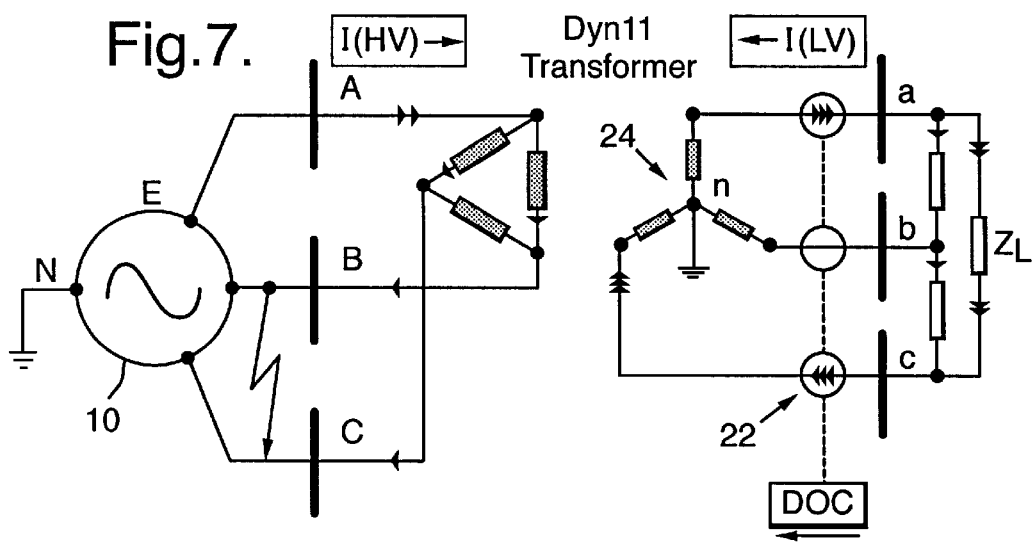
Fig. 7.
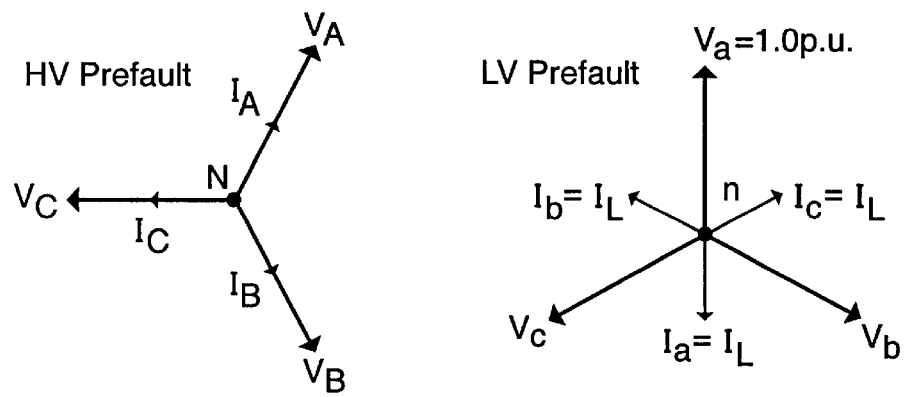
Fig. 8.
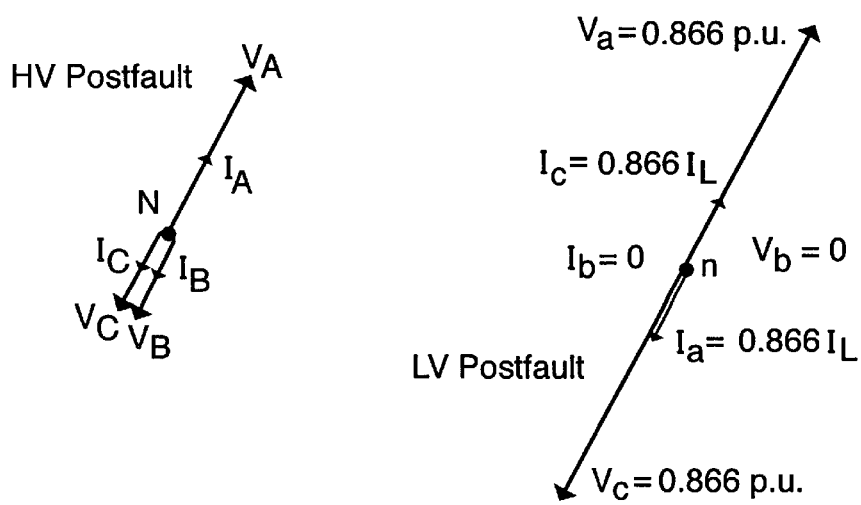

PARALLEL-FEEDER DIRECTIONAL OVERCURRENT PROTECTION

BACKGROUND OF THE INVENTION

1. Field of the Invention

The invention relates to an arrangement for countering an undesired operation of directional overcurrent protection relays situated in parallel feeders of each phase of a multiphase AC power system, in particular—but not exclusively—a three-phase power system.

2. Description of the Related Art

Overcurrent protection systems are known in which (see FIG. 1) a multiphase (normally 3-phase) power source 10 feeds a correspondingly multiphase load 11 by way of respective source and load busbars 12, 13 and an arrangement of first feeders 20 and parallel-connected second feeders 30 linking these busbars. Three sets of relays 21/31, 22/32 and 23/33 are connected in the feeders 20/30. Each feeder 20 and 30 has a non-directional overcurrent protection relay 21 and 31, respectively, on the load side of the source busbars 12 and a directional overcurrent relay 22 and 32, together with a non-directional overcurrent relay 23 and 33, respectively, on the source side of the load busbars 13. These latter two sets of relays may be realized in each case as a single set of devices having two different characteristics (see later). As an alternative arrangement (FIG. 2), the feeders 20/30 may be connected to the secondaries 24 of respective transformers 25/35, the primaries 26/36 being fed from respective sets of non-directional relays 21/31.

To explain the mode of operation of overcurrent relays in general, reference will be made to FIG. 3, in which a three-phase feeder is shown in simplified form as a single line containing, in this case, three sections each having a non-directional relay 40/41/42 and an associated current transformer 50/51/52 and circuit-breaking device 60/61/62. The relays are arranged to operate at decreasing overcurrent settings from AC source 10 to fault location F and to have similarly decreasing response times, which in a typical system might involve a difference of around 0.4 s from one relay to the next. When a fault F occurs as shown, it is required that only the circuit breaker 62 in the section concerned be tripped, the remaining breakers continuing to provide a closed path to maintain supply at substations A, B and C which may be feeding loads 63 as shown. Thus, due to the lower fault current levels associated with the location of this fault (the impedance of the feeder is greater) and the above-mentioned so-called grading between the relays in terms of current and time-response, only relay 42 will operate in response to the fault current, leading to tripping of the circuit breaker 62. In like manner, were a fault to develop in the middle section, the fault current would be greater and would serve to operate the relay 41, and thereby trip the circuit breaker 61, and so on.

The relays may have any of three response characteristics, namely instantaneous-time (this is assumed not to be the case in FIG. 3), dependent-time and independent-time. The later two characteristics are shown in FIG. 4, which is a graph of time "t" against current "I". The curve 70 represents a dependent-time characteristic and curve 71 an independent-time characteristic. Curve 70 provides a response time which varies according to the level of fault current seen by the relay, response being slower at lower current values than at higher current values. For curve 71, the response time is invariant when fault-current exceeds a certain value $I_1$.

Directionality of a relay is achieved by the use of a reference quantity, normally system voltage, against which current is compared, the relative phase between these two quantities determining the "direction" of the current. The relay then only responds if that direction is the one to which the relay has been configured to respond. Thus, a directional relay has two inputs: voltage and current. The reference voltage is often referred to as the "polarizing voltage".

Referring now to FIGS. 5(*a*) and (*b*), these represent a simplification of FIGS. 1 and 2, respectively, inasmuch as the three-phase system is represented as a single line diagram containing two parallel-connected feeders and the associated directional and non-directional relays. If it is assumed that no fault exists on the AC system and that the system is working at full capacity, the feeders 20/30 will each pass half the total rated load current $I_L$. However, the relays will be designed to have a minimum safe overcurrent setting in excess of the maximum load current $I_L$ on the assumption that one of the feeders might be out of service. In the event a fault develops on one of the feeders, that current setting may be exceeded for one or more relays, causing that or those relays to register a fault current level (i.e., to "pick up") and, following a time delay, to trip its associated circuit breaker (i.e., to "time out"). Of course, the "time out" only occurs if the fault is not cleared before expiry of the relay's time delay.

In the case of FIG. 5, it is assumed that a fault has developed on one feeder at the location F1 shown. The fault may be either phase-to-phase or phase-to-earth. In the absence of the fault, power flow was from source to load and therefore the directional relays 80, 81 were nominally insensitive to the normal load current which consequently flowed. However, with the appearance of the fault at F1, current flow changes so that, if the fault current is represented as $I_{F1}$, a proportion of that current (e.g., $I_{F1}/2$) will flow into the fault branch via non-directional relay 82 and the remainder ($I_{F1}/2$) via non-directional relay 83 and directional relay 91. The actual value of fault current in each branch is dependent on fault position and will not necessarily split equally between the branches. Under these circumstances current flow in the relay 81 is in the right direction for it to operate. It will in fact operate provided that firstly, the fault current exceeds its fault-current threshold, and secondly, its set response time is shorter than the duration of the fault. Similar considerations hold for the transformer feeder arrangement of FIG. 5(*b*).

FIGS. 6(*a*) and 6(*b*) show two possible relay co-ordination diagrams for the various relays shown in FIG. 5. In the first case, the relays are configured as dependent-time relays having the characteristic shown as curve 70 in FIG. 4, but with the non-directional relays 84, 85 and 86 graded in terms of response time for a fault current $I_{F2}$. The current-threshold settings of relays 83 and 85 are identical; (these settings are, incidentally, stored in non-volatile memory in the relay). It is the fact that relays 83 and 85 are set the same which causes the initial problem (which is resolved by the use of directional overcurrent relays), i.e., that for a fault at F1, relay 85 could operate prior to relay 83, effectively isolating the load, since relay 82 would also operate. The directional relays 80, 81 are arranged to operate (trip their associated circuit breaker) at a lower current level, as it is commonly perceived that their setting is not restricted by the value of load current. The situation is similar in FIG. 6(*b*), but with all the relay characteristics being of the independent-time type.

As mentioned briefly earlier, it is possible to combine the functions of relays 81 and 83 in one unit, and this may be either a microprocessor-based or numerical relay having two separate sets of overcurrent protection elements.

It is known that the use of a directional relay in each branch can serve as an effective method of isolating all feeder faults with minimal system disruption. Further to this, it has also been recognized as desirable to set the current threshold of the directional relays below normal rated load current, since this can assist with the co-ordination (grading) of the various relays present in the system, in the manner illustrated in FIG. 3. However, there has to date been no guidance offered as to how far below load current such relays may be set while maintaining reliability of operation. Indeed, it has even been suggested that directional protection is not responsive at all to load current in the non-operating direction, so that effectively no problem exists regarding the actual setting used. Other authorities imply that 50% of load current may be a suitable rule of thumb.

SUMMARY OF THE INVENTION

The present invention is the result of an appreciation by the inventors of the dangers of using a current setting which is too low for the directional relays due to the possible occurrence of a particular kind of fault on the feeders. The invention enables a realistic reliable threshold of current to be set, while also providing a means for countering possible wrong operation of the directional relays in the event that this threshold is not adhered to.

In accordance with a first aspect of the invention there is provided an arrangement for countering an undesired operation of one or more directional overcurrent protection relays situated in each phase of each of a plurality of parallel feeders in a multiphase AC power system, the feeders being fed from an AC power source and feeding in turn a load, the relays being situated at a load end of said feeders and being configured to respond to power flow directed towards said source, wherein an operated state of a relay in one phase is validated only when a relay in at least one other phase is in a likewise operated state.

The AC system may be a three-phase system and the arrangement may comprise for each feeder a two-out-of-three deciding means fed from the outputs of the relays associated with said feeder.

The relays may be independent-time relays or dependent-time relays.

According to a second aspect of the invention, there is provided a directional overcurrent protection relay for inclusion in each phase of each of a plurality of parallel feeders in a multiphase AC power system, the feeders being transformer feeders fed from an AC power source and respectively supplying a load, the relay being intended to be situated at a load end of said feeders on a secondary side of a respective transformer and to be configured to respond to power flow directed towards said source, wherein a minimum safe operating current level of the relay is set at a minimum of about 85% of a rated load current associated with said feeders.

The minimum safe operating current level may be set at between 86 and 87% of the rated load current and is preferably 86.7% of the rated load current.

BRIEF DESCRIPTION OF THE DRAWINGS

Embodiments of the invention will now be described, by way of example only, with reference to the drawings, of which:

FIG. 7 is a schematic diagram of a single 3-phase transformer-feeder arrangement showing a B-C phase source fault according to the invention;

FIG. 8 is a set of voltage and current vector diagrams relating to the transformer primary and secondary both before and after the appearance of the B-C phase source fault shown in FIG. 7;

DETAILED DESCRIPTION OF THE PREFERRED EMBODIMENT

Figure 2:
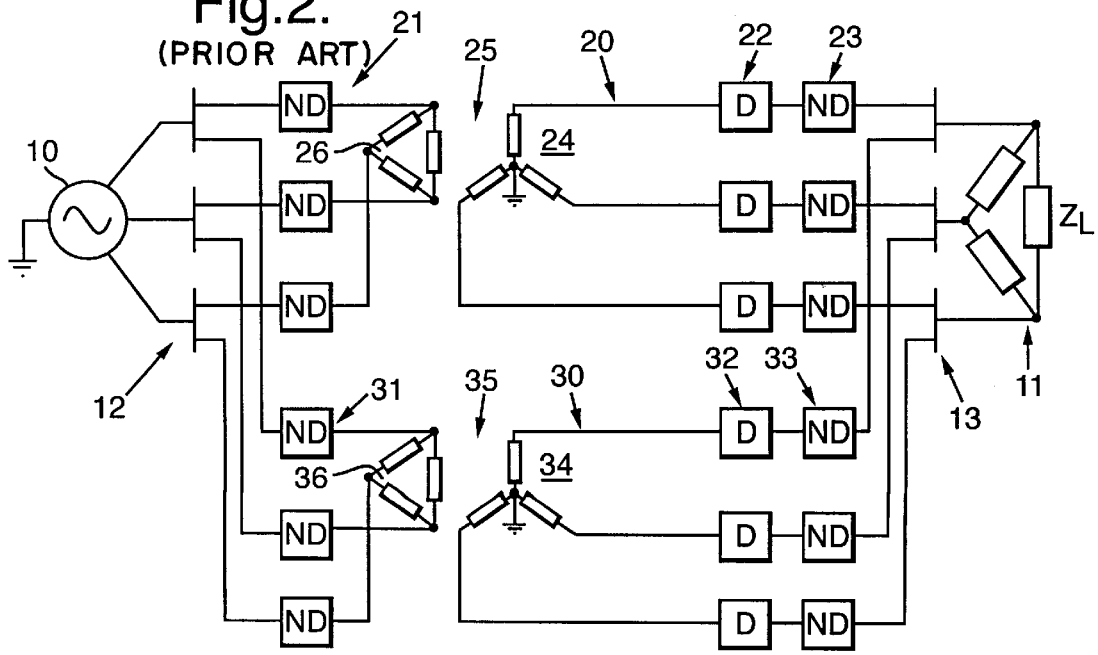
FIG. 2 is the equivalent of FIG. 1, but involving transformer feeders.
Figure 3:
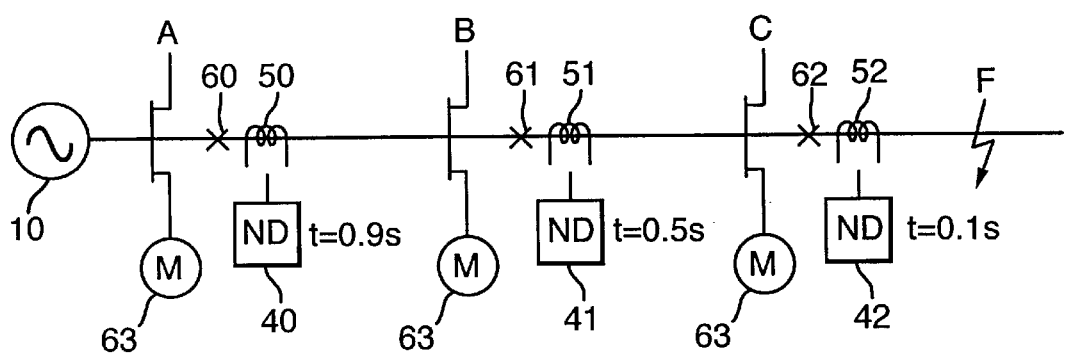
FIG. 3 shows the grading commonly employed between relays located in different sections along a feeder according to the prior art.
Figure 4:
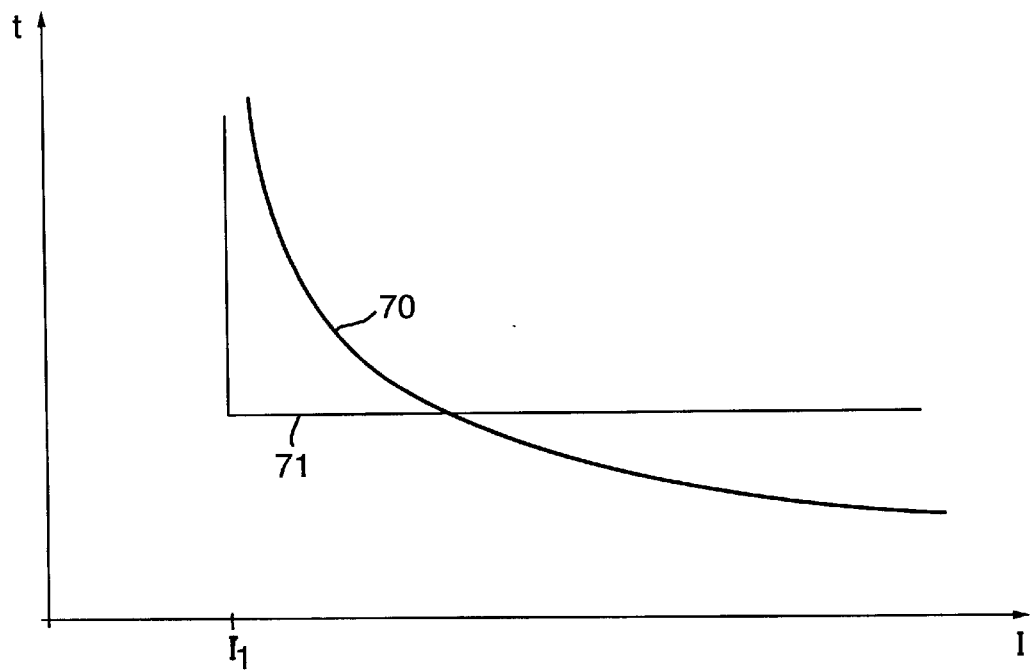
FIG. 4 is a diagram comparing a dependent-time relay characteristic with an independent-time relay characteristic.
Figure 5A:
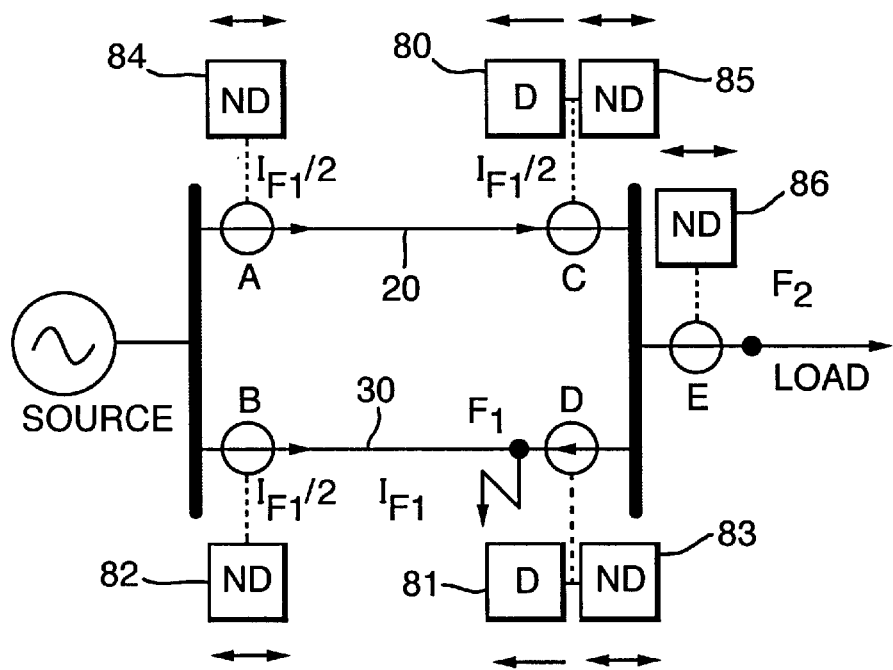
FIGS. 5(a) and 5(b) are simplified representations of plain and transformer parallel-feeder arrangements, respectively, in the presence of a feeder fault.
Figure 5B:
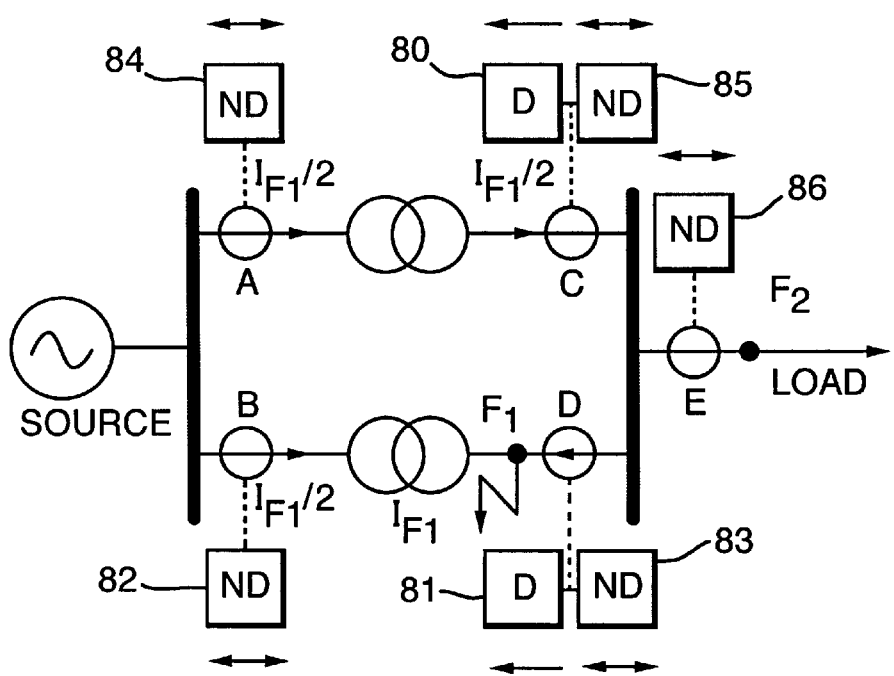
Figure 6A:
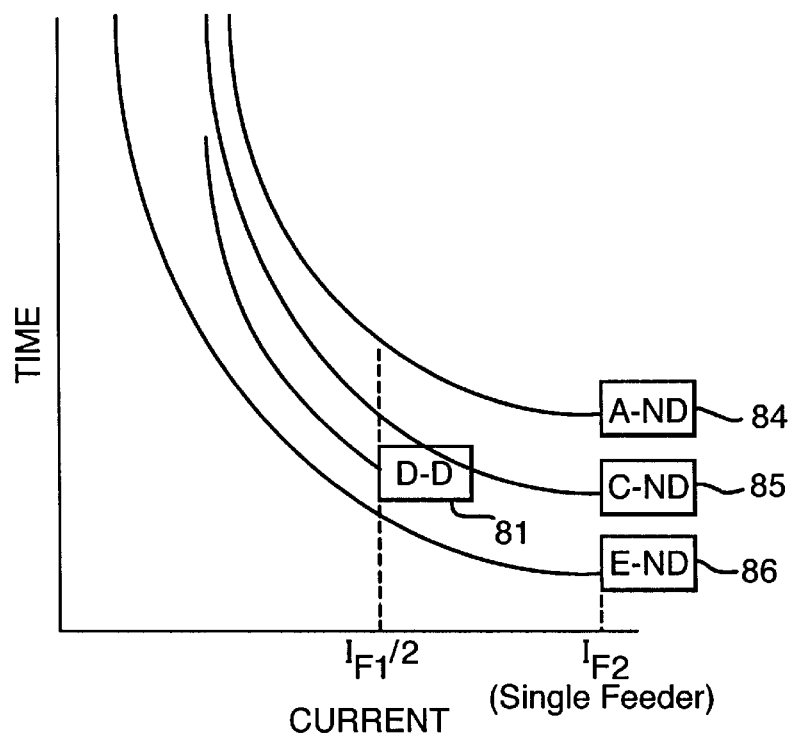
FIGS. 6(a) and 6(b) show respectively typical dependent-time and independent-time response grading for the arrangements shown in FIGS. 5(a) and 5(b)
Figure 6B:
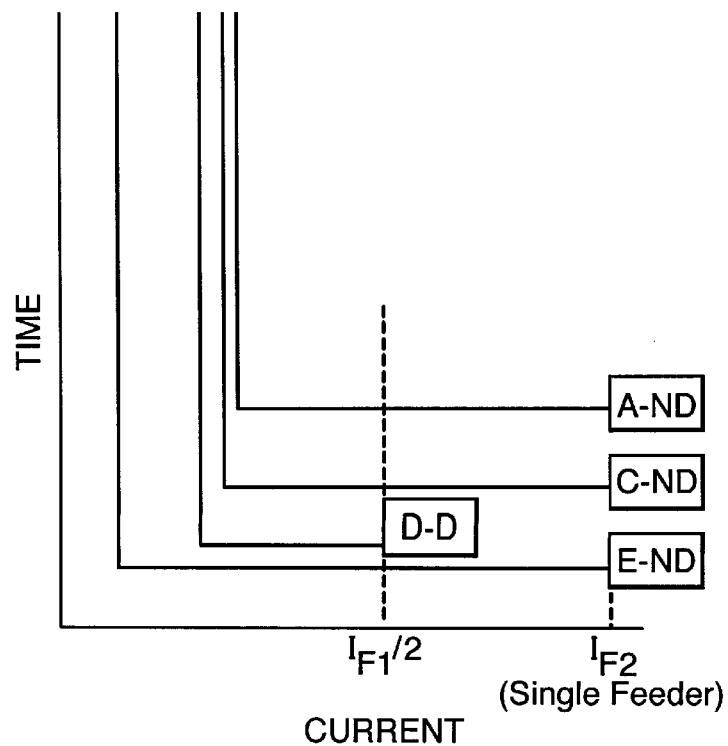

The fault situation which the inventors have managed to isolate as representing a threat to the reliable operation of directional relays, at low current settings, is illustrated in FIG. 7 for the case of the transformer feeder (see FIG. 2 and FIG. 5(b)). In FIG. 7 only one of a pair of three-phase parallel feeders is shown since it is the generic behavior of the directional relays which is of interest here. The directional overcurrent relays are shown referenced as 22, being fed from the star-connected secondary 24 of a Dyn 11 transformer.

In this case a fault exists not at location F1, as in FIG. 5, but at the source 10 itself between two phases, namely phases B and C. The various currents flowing in the primary (high-voltage [HV] circuit) and secondary (low-voltage [LV] circuit) of the transformer for pre-fault and post-fault conditions are as shown in FIG. 8. It can be seen that the level of LV load current on two phases during the fault is 86.7% of the pre-fault level and that on the remaining phase virtually zero.

Figure 9:
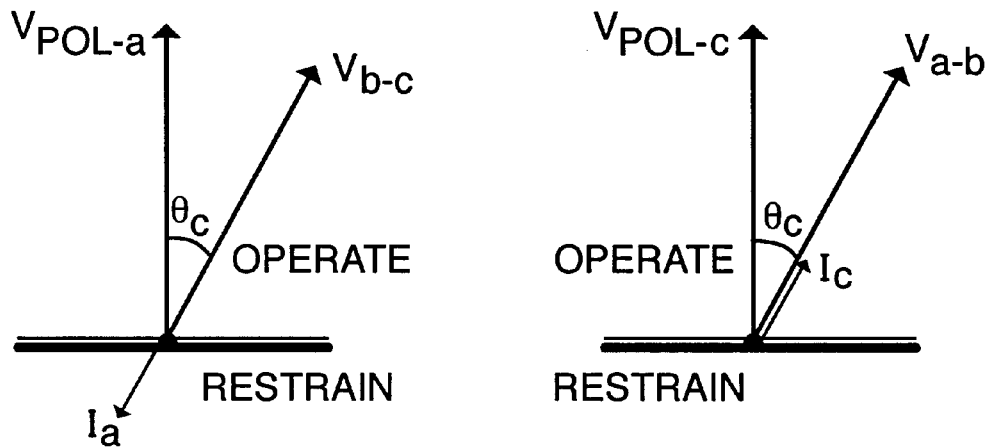
FIG. 9 shows voltage and current vector diagrams in relation to the operate and restrain areas of the relay characteristic.

FIG. 9 graphically illustrates the behavior of the two particular LV directional elements which see significant current during the HV fault. It can be seen that the C-phase directional element sees a polarizing voltage and operating current relationship that may lead to unwanted protection operation. Such unwanted operation would only be possible if the LV directional protection current setting were less than 86.7% of the pre-fault load current.

For parallel transformer feeders, a normal design criterion is that the maximum system load must be carried with one of the feeders out of service. In the case of two parallel feeders, without any allowance for some short-term overload capability, the maximum pre-fault load current for each feeder would be 50% of rated current. If such a rule is applied and if both feeders are in service, then the directional relays at the load-bus end could safely be set as low as 43.3% of rated current in order to offer secure protection during HV faults.

When one of the parallel feeders is intentionally out of service for maintenance purposes, the pre-fault load current seen by the transformer LV directional relays might be as much as 100% of rated current. To offer best security against HV phase-to-phase faults, the directional protection should not be set below 86.7% of rated current, although settings somewhat lower (e.g. around 85%, and more specifically between 86% and 87%) will offer marginally less security. When there are only two parallel feeders, of course, the directional protection is not required to be in service when one feeder is out of action.

Where three three-phase feeders are provided, the pre-fault load current with all feeders in service might be 66.7% of rated current and therefore LV directional protection should not be set below 57.7% of rated current to ensure secure directional protection.

Figure 1:
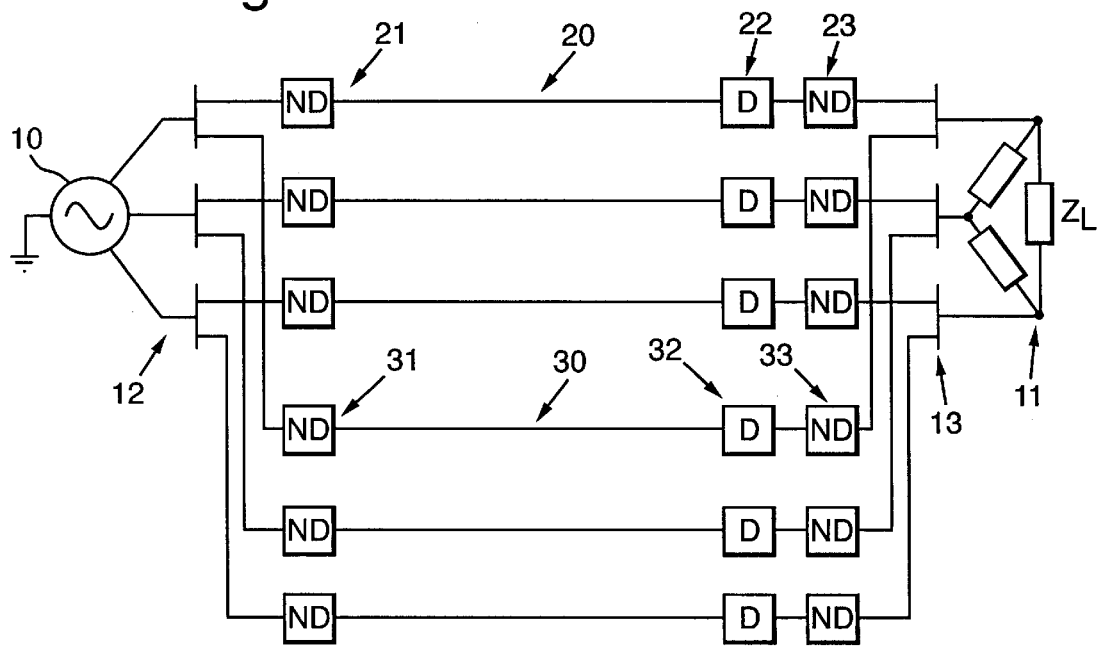
FIG. 1 is a schematic diagram of a known 3-phase plain parallel feeder arrangement comprising non-directional and directional overcurrent relays.
Figure 10:
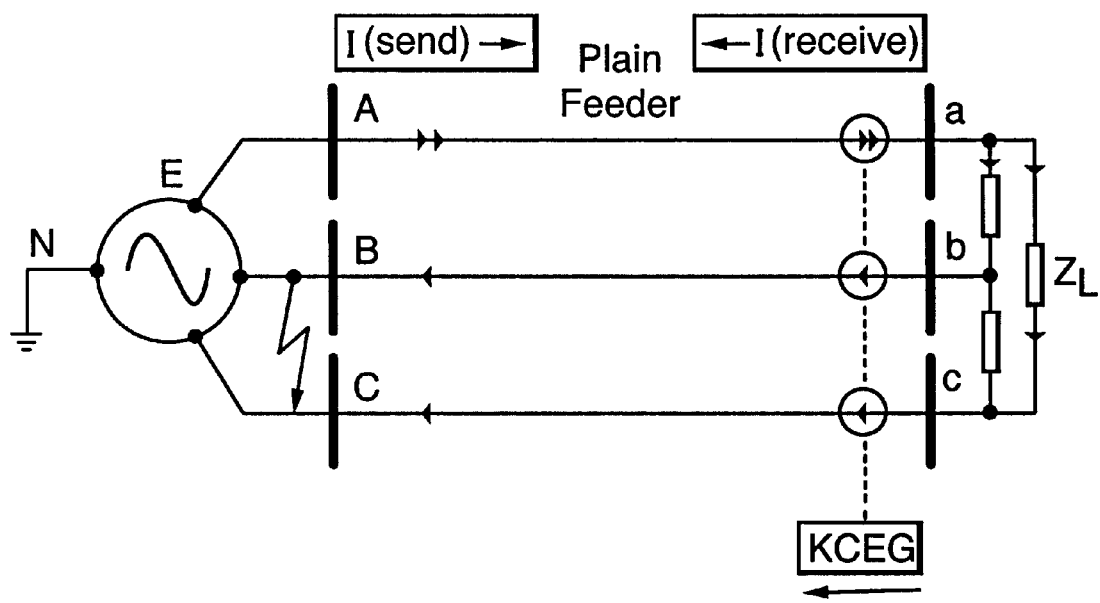
FIGS. 10, 11 and 12 correspond to FIGS. 7, 8 and 9 for the case of a plain feeder, FIG. 12 showing relay behavior for all three phase relays.
Figure 11:
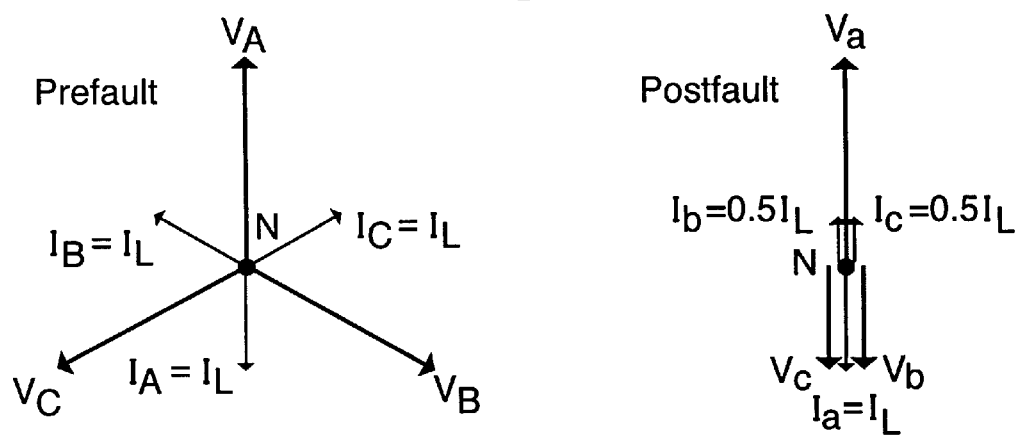
Figure 12:
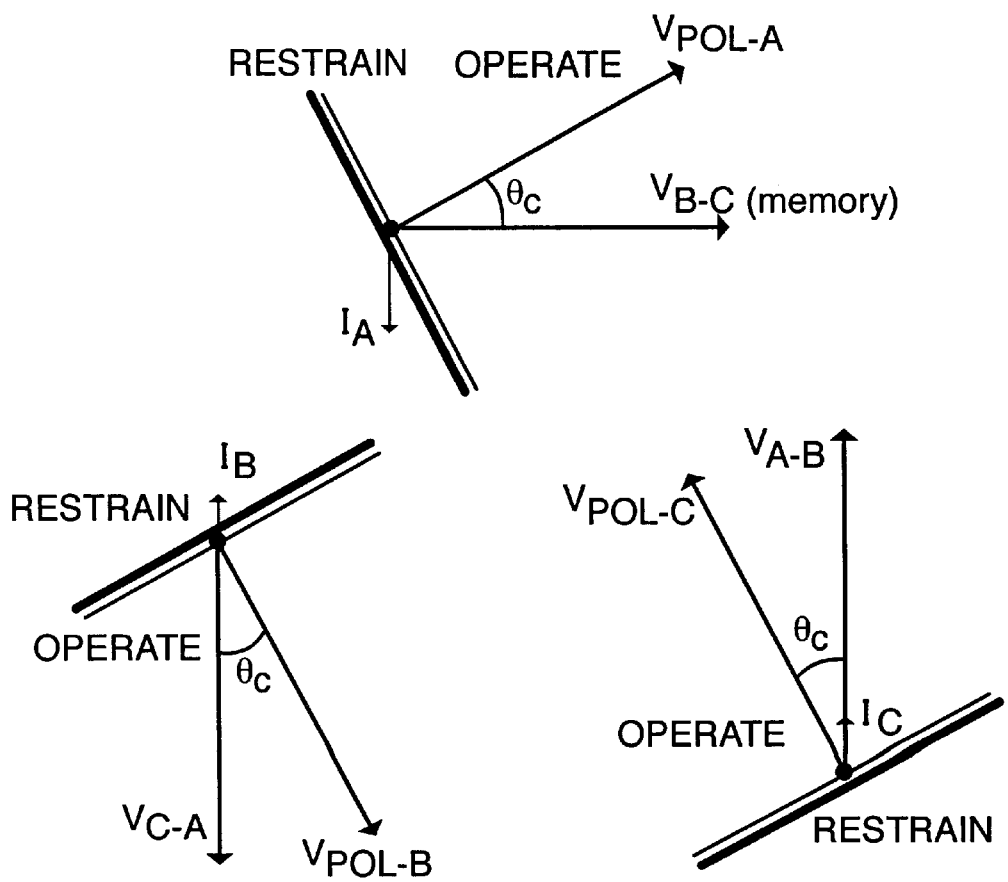

A similar situation to that illustrated in FIGS. 7 to 9, but involving plain parallel feeders (cf. FIG. 1 and FIG. 5(*a*)) is shown in FIGS. 10 to 12. In FIG. 11 the level of load current on two of the phases during a source fault would be 50% of the pre-fault level and on the third phase, 100%. FIG. 12 graphically illustrates the behavior of the three load-end directional elements during the source fault. The B-C phase polarizing voltage for the A-phase directional relay is zero. This would normally prevent many electromechanical or even static directional relays from making a directional evaluation for the A-phase. However, relays are available which incorporate a memory arrangement for recording the level of the polarizing voltage prior to a fault (a typical memory duration might be around 3 seconds) and therefore the behavior of the A-phase element with a B-C polarizing voltage memory can also be considered.

It can be seen from FIG. 12 that the C-phase directional relay element sees a polarizing voltage and operating current relationship that may lead to unwanted operation of that relay. Such unwanted operation would only be possible if the load-end directional relay current setting were less than 50% of the pre-fault load current level. It can also be seen from this figure that the A-phase directional relay will be restrained from operating for a unity power-factor load condition here considered. There will also be restraint for a lagging power-factor, or even a slightly leading power-factor loading. A leading-load power factor of <0.867 would be required to produce a boundary condition causing the A-phase directional relay to operate, and this would constitute an extremely unlikely condition.

When considering the normal design criterion for parallel feeders, discussed earlier, where the maximum system load must be carried with one of the feeders out of service, the minimum safe current setting for directional relays on two parallel feeders would be 25% of rated current and for three feeders, 33% of rated current.

As stated earlier, the inventors have recognized a potential problem not previously appreciated by workers in this technical field, namely that faults at the power source can cause unwanted operation of directional relays at the load-bus end unless certain operating-current thresholds are implemented. This problem has to date been masked by two commonly occurring conditions: firstly, infrequent use of very low current settings in general and, secondly, infrequent maximum loading of overcurrent-protected feeders. Even where a minimum safe setting threshold is slightly exceeded by a fault current, the application of dependent-time relays characteristics often results in a relay response time long enough for the fault in question to be cleared before the relay actually operates. It is the case, however, that for power systems in some parts of the world, shortage of power plant can mean that each feeder of a parallel set is loaded to near full capacity, even when all the plant available is in service. In such situations, it would be essential to adopt minimum directional-relay current settings, as aforesaid, of around 85% (nominally 86.7%) of rated current for transformer feeders or around 50% for plain feeders. These criteria must be especially adhered to where independent-time relays are employed such that the time it takes such a relay to erroneously operate is less than the clearance time for the source fault.

In a further aspect of the present invention, an alternative approach is offered to the observance of the above-described strict current-threshold criteria. This involves the application of, in a 3-phase system, a 2-out-of-3 logic arrangement so that a feeder section is only taken out of circuit if two directional relays out of the three present in the 3-phase system have operated and are calling for their respective circuit breakers to trip. The rationale behind this approach can be appreciated from an inspection of FIGS. 9 and 12, in which it is apparent that, in an erroneous-operation situation resulting from a source fault, only one out of the three directional relays for the three phases will operate. In both figures this is the C-phase relay. However, when a fault occurs downstream of the source, this being a situation in which it may be desired that a directional relay should operate, directional relays associated with at least two phases will operate.

Figure 13:
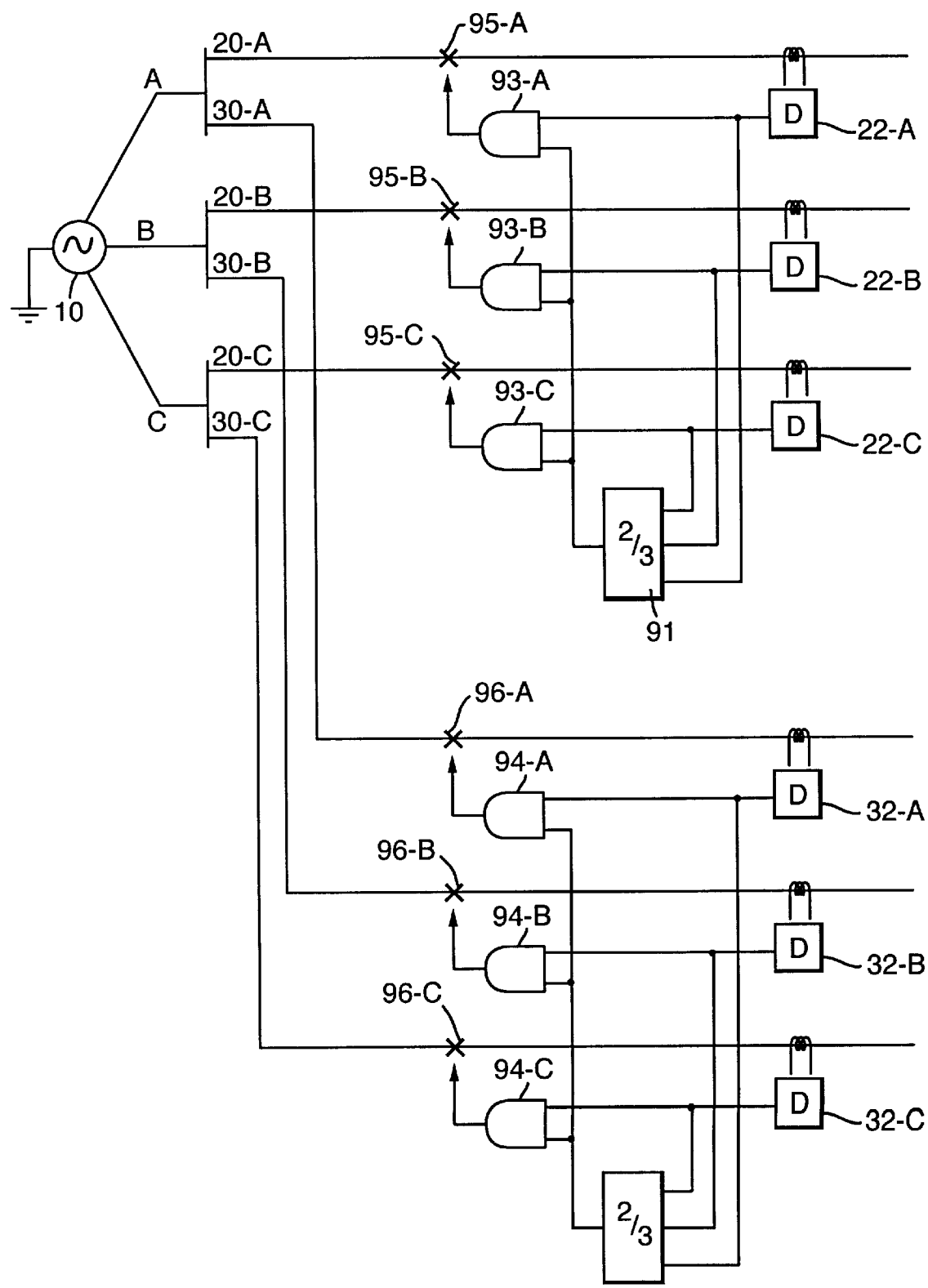
FIG. 13 shows a 3-phase plain parallel feeder arrangement incorporating a 2-out-of-3 decision circuit in accordance with an aspect of the invention.

A hardware implementation of the 2-out-of-3 stage is shown in FIG. 13. In FIG. 13 the outputs of directional relays 22 (more precisely 22-A, 22-B, 22C for the three phases A, B, C), associated with a first parallel feeder 20, are taken to respective AND-gates 93, the outputs of which are used to trip the respective circuit breakers 95. The same relay outputs are also fed to a 2-out-of-3 stage 91, the output of which is used as a common enabling input to the AND-gates 93. An analogous situation holds for the second feeder 30.

In operation, when any two of the three directional relays 22, or any two of the three relays 32, operates, the AND-gates for that particular feeder pass on the trip signal from those relays which have operated to the respective circuit breakers 95 and 96. In the case of a source fault, however, as described above, since only one relay per feeder will have operated, no such enabling of the AND-gates takes place and the relevant circuit breaker is not tripped.

It should be appreciated, of course, that in practice the logic functions illustrated in FIG. 13 may well be implemented in software rather than hardware.

We claim:

1. In a multiple phase AC power system having
   A) an AC power source,
   B) a load,
   C) a plurality of feeders for each phase, each feeder having a source end fed from the AC power source, and a load end for feeding the load, and
   D) a plurality of directional overcurrent protection relays, each relay being situated at the load end of each feeder and being switchable to a tripped state in the event of a fault causing power to flow towards the AC power source,
   an arrangement for countering an undesired switching of one of the relays in one of the phases in the event of the fault, the arrangement comprising:

a) means for detecting when another of the relays in another of the phases has switched to the tripped state; and b) means for validating the switching of said one relay to the tripped state only after the detecting means has detected that said another relay is in the tripped state.

2. The arrangement of claim 1, wherein each relay has an independent-time characteristic.

3. The arrangement of claim 1, wherein each relay has a dependent-time characteristic.

4. The arrangement of claim 1, wherein the detecting means includes a logic circuit connected to outputs of the relays, and wherein the validating means includes a two-out-of-three stage operatively connected to the logic circuit.

5. The arrangement of claim 1, wherein each feeder includes a transformer having a primary winding fed from the AC power source at the source end, and a secondary winding connected to the load at the load end.

6. In a multiple phase AC power system having

A) an AC power source,

B) a load,

C) a plurality of transformer feeders for each phase, each transformer feeder having primary winding at a source end fed from the AC power source, and a secondary winding at a load end for feeding the load, each transformer feeder having a rated load current, and D) a plurality of directional overcurrent protection relays, each relay being situated at the load end of each transformer feeder and being switchable to a tripped state in the event of a fault causing power to flow towards the AC power source, an arrangement for countering an undesired switching of one of the relays in the event of the fault, the arrangement comprising:

means for setting a safe operating current level for said one relay at a minimum of about 85% of said rated load current.

7. The arrangement of claim 6, wherein the safe operating current level is set at between 86% and 87% of said rated load current.

8. The arrangement of claim 7, wherein the safe operating current level is set at 86.7% of said rated load current.

9. In a multiple phase AC power system having

A) an AC power source,

B) a load,

C) a plurality of feeders for each phase, each feeder having a source end fed from the AC power source, and a load end for feeding the load, and D) a plurality of directional overcurrent protection relays, each relay being situated at the load end of each feeder and being switchable to a tripped state in the event of a fault causing power to flow towards the AC power source, a method of countering an undesired switching of one of the relays in one of the phases in the event of the fault, the method comprising the steps of:

a) detecting when another of file relays in another of the phases has switched to the tripped state; and b) validating the switching of said one relay to the tripped state only after the detection that said another relay is in the tipped state.

10. The method of claim 9, wherein each relay has an independent-time characteristic.

11. The method of claim 9, wherein each relay has a dependent-time characteristic.

12. The method of claim 9, wherein the detecting step is performed by a logic circuit connected to outputs of the relays, and wherein the validating step is performed by a two-out-of-three stage operatively connected to the logic circuit.

13. The method of claim 9, wherein each feeder includes a transformer having a primary winding fed from the AC power source at the source end, and a secondary winding connected to the load at the load end.

14. In a multiple phase AC power system having

A) an AC power source,

B) a load,

C) a plurality of transformer feeders for each phase, each transformer feeder having a primary winding at a source end fed from the AC power source, and a secondary winding at a load end for feeding the load, each transformer feeder having a rated load current, and D) a plurality of directional overcurrent protection relays, each relay being situated at the load end of each transformer feeder and being switchable to a tripped state in the event of a fault causing power to flow towards the AC power source, a method of countering an undesired switching of one of the relays in the event of the fault, the method comprising the step of:

setting a safe operating current level for said one relay at a minimum of about 85% of said rated load current.

15. The method of claim 14, wherein the safe operating current level is set at between 86% and 87% of said rated load current.

16. The method of claim 14, wherein the safe operating current level is set at 86.7% of said rated load current.

* * * * *